United States Patent
Morton

(10) Patent No.: US 6,205,269 B1
(45) Date of Patent: Mar. 20, 2001

(54) OPTICAL ADD/DROP MULTIPLEXER

(75) Inventor: Paul A. Morton, West Friendship, MD (US)

(73) Assignee: Ciena Corporation, Linthicum, MD (US)

(*) Notice: Subject to any disclaimer, the term of this patent is extended or adjusted under 35 U.S.C. 154(b) by 0 days.

(21) Appl. No.: 09/286,848

(22) Filed: Apr. 6, 1999

(51) Int. Cl.$^7$ .................................................. G02B 6/28
(52) U.S. Cl. ............................. 385/24; 385/37; 359/124; 359/127; 359/130
(58) Field of Search ................. 385/24, 37; 359/124, 359/127, 130

(56) References Cited

U.S. PATENT DOCUMENTS

| | | | |
|---|---|---|---|
| 5,712,717 | * 1/1998 | Hamel | 359/130 |
| 5,717,798 | * 2/1998 | Strasser | 385/37 |
| 5,748,349 | * 5/1998 | Mizrahi | 359/130 |
| 5,748,350 | * 5/1998 | Pan | 359/130 |
| 5,822,095 | * 10/1998 | Taga | 385/24 |
| 5,982,518 | * 11/1999 | Mizrahi | 385/24 |
| 6,041,152 | * 3/2000 | Clark | 385/24 |
| 6,067,389 | * 5/2000 | Fatehi | 385/17 |

FOREIGN PATENT DOCUMENTS

0794629A2 * 9/1997 (EP).
0857988A1 * 8/1998 (EP).

* cited by examiner

Primary Examiner—Cassandra Spyrou
Assistant Examiner—Leo Boutsikaris
(74) Attorney, Agent, or Firm—Daniel N. Daisak; David L. Soltz

(57) ABSTRACT

An add/drop multiplexer includes first and second fiber grating connected to a four-port optical circulator having first and second input/output ports, an add port, and a drop port, wherein the first fiber grating is connected to the first input/output port and the second fiber grating is connected to the second input/output port. Add signals provided to the add port of the circulator are reflected by the first fiber grating back to the optical circulator and propagate, along with one or more input optical signals, to the second fiber grating. One or more of the input optical signals are reflected by the second fiber grating back to the optical circulator and propagate to the drop port of the circulator.

11 Claims, 2 Drawing Sheets

OPTICAL ADD/DROP MULTIPLEXER

FIELD OF THE INVENTION

This invention pertains to the field of wavelength division multiplexed optical communication systems and, more particularly, to an add-drop multiplexer for transferring selected optical channels between transmission paths within a wavelength division multiplexed optical communication system.

BACKGROUND OF THE INVENTION

Wavelength Division Multiplexing (WDM) techniques have been utilized to significantly enhance the signal capacity of optical communication systems. WDM systems simultaneously transmit multiple information signals on a single waveguide medium at different wavelengths or channels. Examples of such communication systems include, telecommunications systems, cable television systems, local area networks (LANs) and wide area networks (WANs). In a WDM system, optical signals are generated and multiplexed onto a plurality of optical channels, transmitted over a single optical waveguide, and demultiplexed at one or more destination terminals. Dense WDM (DWDM) systems are characterized by relatively close spacings between the respective channels.

WDM or DWDM communication systems may carry signals over many miles, with the system having a number of different origination and destination terminals or nodes. In many of these systems, channels are added/dropped from the WDM signal corresponding to one or more different origination/destination nodes. This form of optical signal routing is generally referred to as "add/drop multiplexing." A number of different devices and configurations have been employed as add/drop multiplexers. One approach is explored in Giles and Mizrahi, *"Low-Loss ADD/DROP Multiplexers for WDM Lightwave Networks,"* IOOC Technical Digest, (The Chinese University Press, Hong Kong) c. 1996, pp. 65–67, the disclosure of which is incorporated herein by reference. In this paper, an add-drop multiplexer is proposed which uses two three-port optical circulators with a fiber grating positioned therebetween. Using this configuration, an optical signal to be dropped from multiplexed optical signals is reflected by the fiber grating and exits through a drop port of the first optical circulator. All other input signals exit via a through port of the first optical circulator. Similarly, an optical signal to be added which has a wavelength nominally identical to the optical signal being dropped from the optical transmission path is input to an add port of the second circulator. The signal to be added to the optical transmission path is reflected towards a through port of the second circulator by the same fiber grating disposed between the first and second circulators used for signal dropping.

A disadvantage associated with this type of add/drop multiplexer is the loss associated with the grating and, more significantly, the loss contributed by each of the two circulators. These loss values have a negative effect on the overall system loss budget, i.e. the total amount of optical loss that a given optical link can tolerate while maintaining signal integrity. Moreover, this loss may accumulate over a plurality of nodes each including one or more add/drop multiplexers.

Accordingly, it would be advantageous to provide an optical add/drop multiplexer with reduced optical loss adaptable for use with an optical communication system employing wavelength division multiplexing. Other and further objectives will be apparent from the following detailed description and the appended claims.

SUMMARY OF THE INVENTION

The present invention provides an optical add/drop multiplexer for use in optical communication systems which includes an optical waveguide capable of carrying one or more optical input signals on one or more optical input channels. A first optical fiber grating having an associated stop-band and positioned along the waveguide reflects a particular channel corresponding to the optical channel to be added to the input signals. An optical circulator with four ports optically communicates with the waveguide. The optical input signals not dropped by the first fiber grating, pass through the first grating to a first one of the input/output ports of the optical circulator. The circulator passes the optical input signals to a second input/output port. The second input/output port is connected to a second optical fiber grating. The second optical fiber grating reflects those optical input signals having wavelengths within an associated stop-band, while other optical signals, outside the stop-band, pass through the grating. The optical signals reflected by the second grating exit the circulator through a drop port. In another aspect, an optical circulator receives an optical add signal at an add port and passes the optical add signal to the second input/output port, while preventing the optical add signal from passing to the drop port.

DETAILED DESCRIPTION OF THE INVENTION

Figure 1:
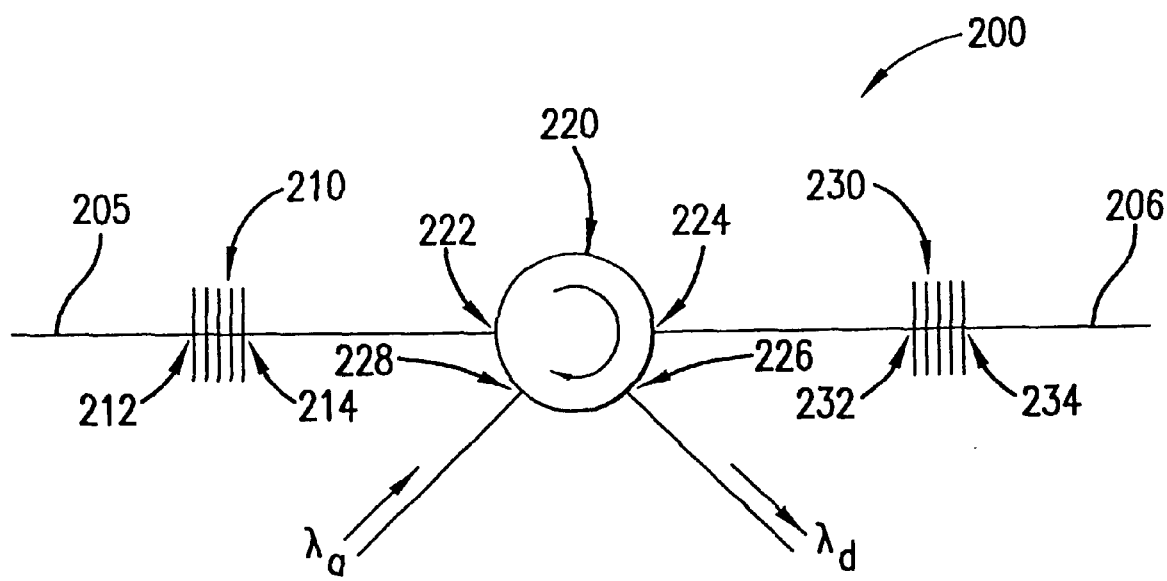
FIG. 1 is a schematic diagram of an optical add/drop multiplexer according to one or more aspects of the present invention.

FIG. 1 schematically illustrates a low-loss optical add/drop multiplexer 200 in accordance with the present invention. The optical add/drop multiplexer 200 comprises a first fiber Bragg grating 210, an optical circulator 220, and a second fiber Bragg grating 230. Gratings 210 and 230 comprise a series of photoinduced refractive index perturbations in an optical fiber which reflect optical signals within a selected wavelength band, referred to as a "stop-band." The stop band is generally centered at the Bragg wavelength defined as $\lambda_{BRAGG} = 2\bar{n}\Lambda$, where $\bar{n}$ is the modal index and $\Lambda$ is the grating period. Bragg gratings suitable for use in the optical device in accordance with the present invention are described in Morey et al., *"Photoinduced Bragg Gratings in Optical Fibers,"* Optics and Photonics News, February 1994, pp. 8–14, the disclosure of which is incorporated by reference herein.

Figure 2:
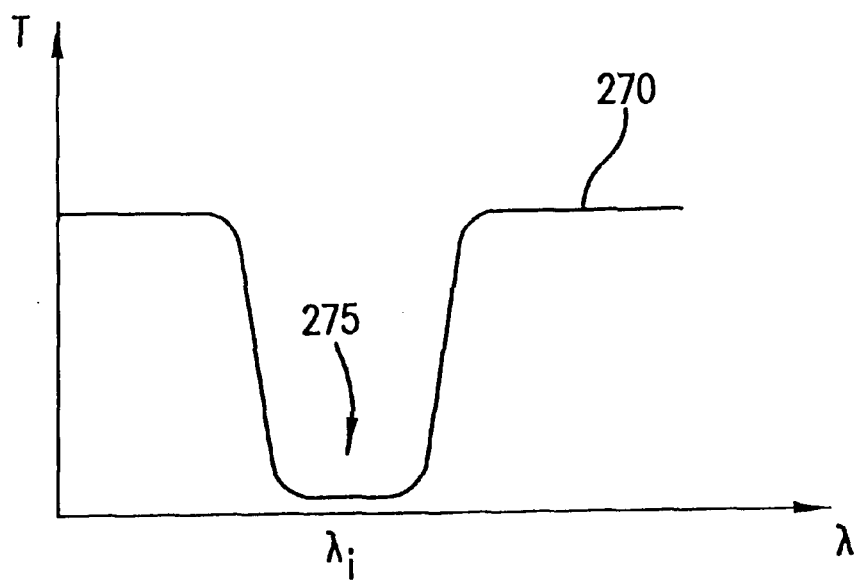
FIG. 2 is transmission spectrum of an exemplary Bragg grating in accordance with the present invention.

Circulator 220 has a first input/output port 222, a second input/output port 224, a drop port 226, and an add port 228. The first grating 210 is positioned along optical transmission path 205 which optically communicates with first input/output port 222. One or more input optical signals are supplied to first port 212 of grating 210 via transmission path 205. FIG. 2 illustrates an exemplary frequency dependent transmission characteristic associated with grating 210 wherein optical channels having wavelengths which fall outside a stop-band pass through the grating and optical channels having wavelengths which fall within the stop-band are reflected by grating. For example, FIG. 2 illustrates a transmittance vs. wavelength spectrum 270 associated with exemplary fiber Bragg grating 210. As can be seen from curve 270, grating 210 is configured to reflect input optical signals having wavelengths falling within stop-band region 275. The optical channels having wavelengths at or very close to $\lambda_i$ where $\lambda_i$ is the channel to be added to the input optical signals fall within stop-band 275 and are reflected by the grating. Optical channels having wavelengths which fall outside stop-band 275 pass through grating 210 to second port 214. The signals which pass through grating 210 are supplied to the first input/output port 222 of circulator 220. These signals propagate within circulator 220 and exit via second input/output port 224.

Second fiber Bragg grating 230 is positioned along transmission path 206 which optically communicates with port 224 of circulator 220. Grating 230 receives the signals supplied by circulator 220 via second input/output port 224. Grating 230 has a frequency-dependent transmission characteristic similar to that described with reference to FIG. 2 wherein optical input signals having wavelengths lying within a stop-band are reflected by grating 230 and wavelengths falling outside the stop-band pass through grating 230. The one or more optical signals supplied to first port 232 of grating 230 which have optical wavelengths falling within the second grating stop-band are reflected back toward second input/output port 224 of circulator 220. These wavelength(s) correspond to the signals to be dropped from the input optical signals received via transmission path 205. The reflected signals propagate clockwise within circulator 220 to drop port 226.

One or more optical channels to be added via add/drop multiplexer 200 are supplied to add port 228 of circulator 220. The optical signal(s) to be added correspond to optical channel(s) having wavelength(s) which fall within the stop-band of grating 210, but outside the stop-band of second grating 230. This prevents crosstalk interference from occurring between the channel(s) to be added and channel(s) having corresponding wavelengths included in the input signals. The optical add signal(s) propagate clockwise within circulator 220 and exit via input/output port 222 to fiber grating 210. Because the optical add signal(s) are on one or more optical channel(s) having wavelength(s) which lie within the stop-band of grating 210, the signals to be added are reflected back toward input/output port 222 of circulator 220. The signals to be added propagate clockwise within circulator 220 and exit via input/output port 224 onto transmission path 206. Because the signal(s) to be added have wavelength(s) which fall outside the stop-band of grating 230, the signals to be added pass-through grating 230 via first port 232 and second port 234. Thus, the second fiber grating 230 passes the signal(s) to be added, together with the optical input signal(s) having wavelengths which fall outside the stop-band of second grating 230. In this manner, add/drop multiplexer employs a single optical circulator to add/drop one or more optical channels, thereby providing lower loss than add/drop multiplexers which employ two optical circulators. Moreover, by preventing the one or more optical signals to be added from entering circulator 220 utilizing grating 210, crosstalk interference between channels to be added and channels having corresponding wavelengths within the input signals is avoided.

Figure 3:
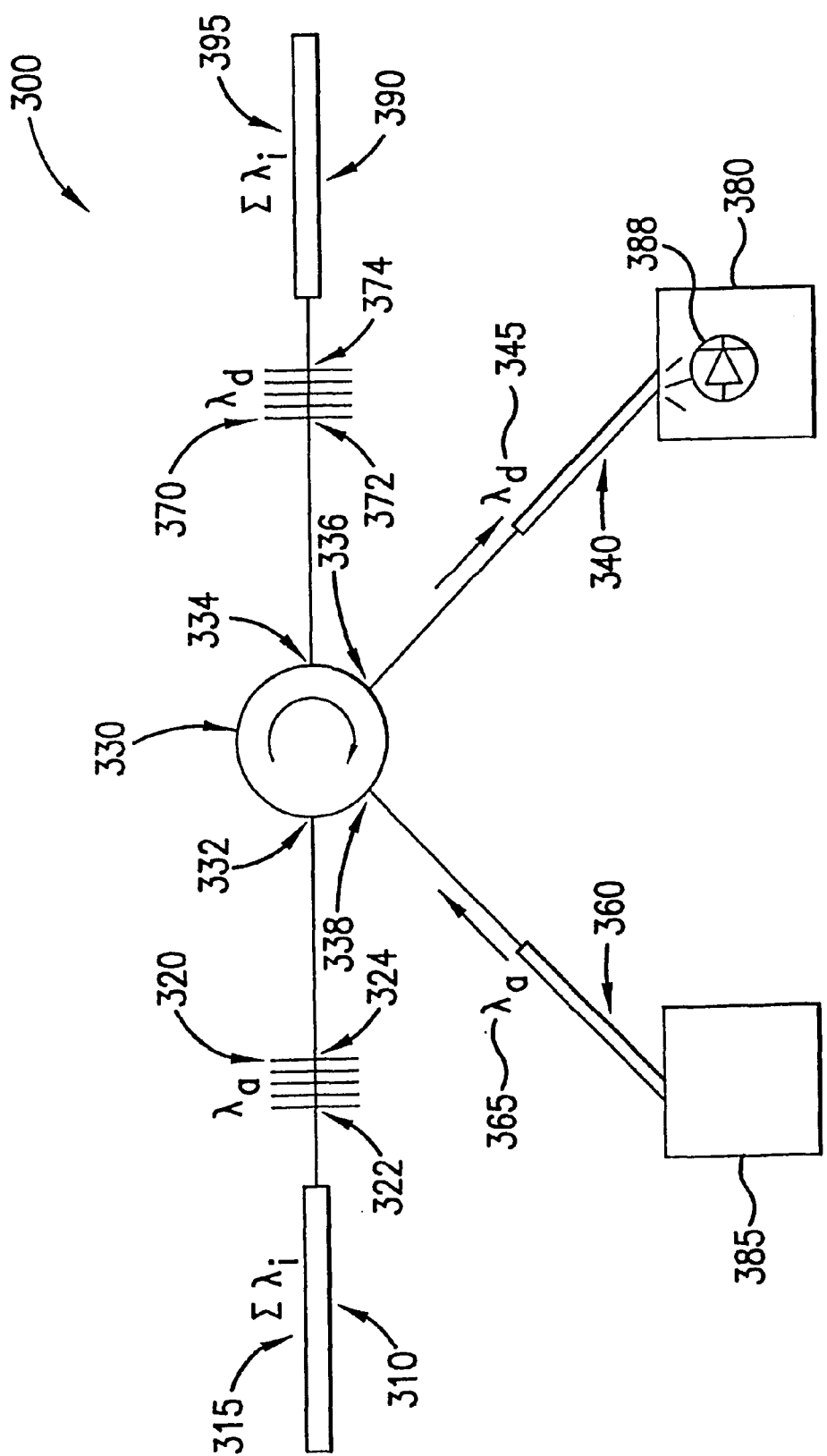
FIG. 3 is a diagram of an optical communication system which employs an optical add/drop multiplexer according to one or more aspects of the present invention.

Operation of an optical communication system having an add/drop multiplexer including a four-port optical circulator will be explained now with reference to FIG. 3. The communication system 300 comprises an optical input waveguide 310 which optically communicates with input port 322 of first fiber Bragg grating 320. Optical waveguide 310 is configured to receive input optical signals such as multiplexed optical signals having channel spacings ranging from, for example, 25–200 GHz. Transmission path 310 is typically a single mode optical fiber, however any optical medium capable of carrying multiplexed optical signals can be used. Grating 320 has a frequency dependent transmission characteristic wherein optical channels having wavelengths which fall outside a stop-band pass through the grating and optical channels having wavelengths which fall within the stop-band are reflected by grating 320. An output port 324 of grating 320 optically communicates with first input/output port 332 of four-port optical circulator 330. A drop port 336 of the four-port optical circulator 330 optically communicates with waveguide 340. Second input/output port 334 optically communicates with second fiber Bragg grating 370.

Optical input waveguide 310 carries wavelength division multiplexed (WDM) optical input signals 315, comprising N optical channels where each optical channel i (i=1 to N) may carry optical signals operating on a different optical wavelength $\Sigma\lambda_{1 \ldots N}$. The WDM optical input signals 315 are provided to input port 322 of the first optical fiber grating 320 which reflects channels having wavelengths within the stop-band of grating 320 and passes, to input/output port 332, channels having wavelengths that fall outside the stop-band. Grating 320 is configured to reflect optical signals having wavelengths, for example $\lambda_a$, that correspond to channels to be added via waveguide 360 and add port 338. The channels falling outside the stop-band of grating 320 propagate in a clockwise direction within circulator 330 and exit via second input/output port 334. Input 372 of second fiber Bragg grating 370 optically communicates with second input/output port 334 and receives the optical signals transmitted through grating 320 as well as optical signals 365 added via port 338. The second grating 370 is configured to reflect optical signals 345 on a selected optical channel having wavelength $\lambda_d$ (where $1 \leq d \leq N$) which falls within a stop-band associated with grating 370. The signals 345 are received by grating 370 and are reflected back toward second input/output port 334. The second optical fiber grating 370 passes the optical signals falling outside the grating stop-band to output port 374.

The four-port optical circulator 330 supplies the optical signals 345 having wavelength $\lambda_d$ reflected by fiber grating 370 to waveguide 340 via drop port 336. Waveguide 340 supplies the signals 345 to terminal 380 which may include, for example, photodetector 388 capable of generating electrical signals in response to the received optical signals 345.

Waveguide 360 supplies the signals to be added 365 from terminal 385 which may include, for example, a light source modulated to generate the optical add signals at 365 having wavlength $\lambda_a$. The add signals 365 are supplied to add port 338 of the optical circulator 330. The optical add signals 365 have corresponding wavelengths that fall within the stop-band of first grating 320, but outside the stop-band of second grating 370. The add signals 365 propagate clockwise within circulator 330 to input/output port 332 and are reflected by first grating 320 back toward input/output port 332. The add signals 365 propagates clockwise within circulator 330 to second input/output port 334. Thus, waveguide 390 carries a WDM optical output signal having wavelengths $\Sigma\lambda_{1 \ldots N}$ which comprises the add signals 365 and the optical signals having wavelengths which lie outside of the stop-band associated with grating 370. In this manner, a single four port optical circulator is used to add optical channels having a first wavelength and drop optical channels having a second wavelength within multiplexed optical communication signals.

While the foregoing invention has been described in terms of the embodiments discussed above, numerous variations are possible. Accordingly, modifications and changes are considered to be within the scope of the following claims.

What is claimed is:

1. An optical add/drop multiplexer comprising:
    a first fiber Bragg grating positioned along an optical waveguide, said first grating configured to reflect a first optical signal operating on a first wavelength and transmit a second optical signal operating on a second wavelength to a first grating output;
    an optical circulator having a first and second input/output ports, an add port and a drop port, said first input/output port optically communicating with said first grating output and configured to receive said second optical signal, said add port configured to receive a third optical signal operating on said first optical wavelength, said second input/output port outputting said second and third optical signals; and
    a second fiber Bragg grating optically communicating with said second input/output port and receiving said second and third optical signals, said second fiber grating reflecting said second optical signal back to said second input/output port and transmitting said third optical signal, said second optical signal exiting said drop port of said optical circulator.

2. The optical add/drop multiplexer in accordance with claim 1 wherein said first fiber grating has a stop-band wherein said first wavelength lies within said stop-band.

3. The optical add/drop multiplexer in accordance with claim 1 wherein said second fiber grating has a stop-band wherein said second wavelength lies within said stop-band.

4. The optical add/drop multiplexer in accordance with claim 1 wherein said second fiber grating has a stop-band wherein said third wavelength falls out7side said stop-band.

5. An optical communication system comprising:
    a first optical waveguide carrying a wavelength division multiplexed optical signal having a plurality of optical channels each at a respective wavelength;
    a first fiber grating positioned along said first optical waveguide, said grating configured to receive said first wavelength division multiplexed optical signal and passing said first wavelength division multiplexed optical signal to a first fiber grating output;
    an optical circulator having a first input/output port, an add port, a drop port and a second input/output port, said first input/output port optically communicating with said first fiber grating output and receiving said first wavelength division multiplexed optical signal, said add port receiving an optical add signal operating on a first optical wavelength, said drop port outputting one of said plurality of optical signals in said first wavelength division multiplexed optical signal, said second input/output port outputting said plurality of optical signals in said first wavelength division multiplexed optical signal and further outputting said optical add signal;
    a second fiber grating optically communicating with said second input/output port of said optical circulator, receiving the first wavelength division multiplexed optical signal and said optical add signal, said second fiber grating reflecting back to said second input/output port said one of said plurality of optical signals in said first wavelength division multiplexed optical signal output by said drop port, and outputting said plurality of optical signals in said first wavelength division multiplexed optical signal other than said one of said plurality of optical signals output by said drop port, and further outputting said optical add signal; and
    a second optical waveguide optically communicating with said second fiber grating and carrying a second wavelength division multiplexed optical signal comprising said first wavelength division multiplexed optical signal other than said one of said plurality of optical signals output by said drop port, and said optical add signal.

6. An optical add/drop multiplexer, comprising:
    a first fiber grating for receiving a first optical signal operating on a first optical wavelength, said first grating configured to transmit said first optical signal to a first fiber grating output;
    an optical circulator having a first input/output, an add port, a drop port and a second input/output port, said first input/output port optically communicating with said first fiber grating output and receiving said first optical signal, said add port configured to receive a second optical signal operating on a second optical wavelength, said drop port configured to output said first optical signal, said second input/output port configured to output said first and second optical signals; and
    a second fiber grating optically communicating with said second input/output port and receiving said first and second optical signals, said second fiber grating configured to reflect said first optical signal back toward said second input/output port and transmit said second optical signal.

7. The optical add/drop multiplexer in accordance with claim 6 wherein said second fiber grating has a stop-band wherein said first wavelength lies within said stop-band.

8. The optical add/drop multiplexer in accordance with claim 6 wherein said second fiber grating has a stop-band wherein said second wavelength falls outside said stop-band.

9. The optical add/drop multiplexer in accordance with claim 6 wherein said first fiber grating is configured to reflect a third optical signal operating on said second optical wavelength.

10. The optical add/drop multiplexer in accordance with claim 6 wherein said first fiber grating is configured to reflect said second optical signal operating at said second wavelength back toward said first input/output port of said circulator.

11. The optical add/drop multiplexer of claim 6, wherein said first fiber grating has a stop-band wherein said second wavelength lies within said stop-band.

* * * * *